US 6,557,700 B1

(12) United States Patent
Wharton

(10) Patent No.: US 6,557,700 B1
(45) Date of Patent: May 6, 2003

(54) SLIDING TRAY PACKAGING

(75) Inventor: Burgo Wharton, Leamington Spa (GB)

(73) Assignee: Duff Design Limited, Rugby (GB)

(*) Notice: Subject to any disclaimer, the term of this patent is extended or adjusted under 35 U.S.C. 154(b) by 0 days.

(21) Appl. No.: 09/868,958

(22) PCT Filed: Dec. 23, 1999

(86) PCT No.: PCT/GB99/04429
§ 371 (c)(1),
(2), (4) Date: Sep. 12, 2001

(87) PCT Pub. No.: WO00/38999
PCT Pub. Date: Jul. 6, 2000

(30) Foreign Application Priority Data

Dec. 24, 1998 (GB) ............................................... 9828461
May 27, 1999 (GB) ............................................... 9912284

(51) Int. Cl.⁷ ............................................... B65D 85/30
(52) U.S. Cl. .................... 206/308.1; 206/312; 206/745
(58) Field of Search .................. 206/308.1, 309.312, 206/493, 122, 126, 745, 249, 267, 254, 255; 229/125.125

(56) References Cited

U.S. PATENT DOCUMENTS 3,589,505 A * 6/1971 Burniski ..................... 206/804
5,243,807 A * 9/1993 Randlett ..................... 206/804
5,330,056 A * 7/1994 De la Rocha ............... 206/804

FOREIGN PATENT DOCUMENTS

| GB | 304449 | 1/1929 |
| GB | 445021 | 4/1936 |
| GB | 1116677 | 6/1968 |
| WO | WO 98 24696 | 6/1998 |

* cited by examiner

*Primary Examiner*—Shian Luong
(74) *Attorney, Agent, or Firm*—Blackwell Sanders Peper Martin LLP

(57) ABSTRACT

A box for use in packaging comprises a tubular sleeve (10) defining a through passage, a planar divider (12) extending across the passage, a drive belt (50) which passes around the divider, a tray (40) and a pull-out tab member (41) each extending into the passage and attached to the drive belt. In the closed position the tray (40) and tab member (41) are fully inside the tubular sleeve. When the tab member (41) is pulled out of the sleeve (10) in a first direction, the drive belt (50) is forced to slide around the divider and the tray (40) moves out of the sleeve (10) in the opposite direction. The tray (40) can be used to house any consumer product, for example CDs, confectionery, pharmaceuticals. The tab member (41) can be used to convey information to the consumer.

18 Claims, 9 Drawing Sheets

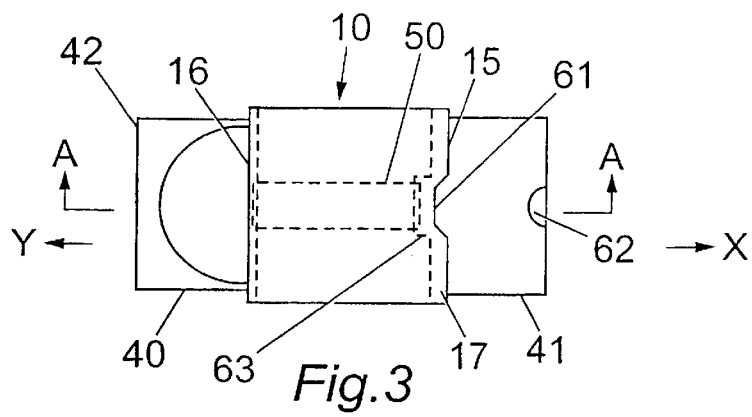
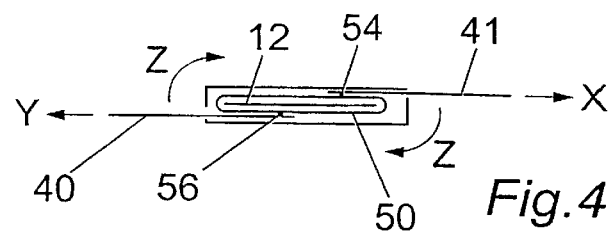
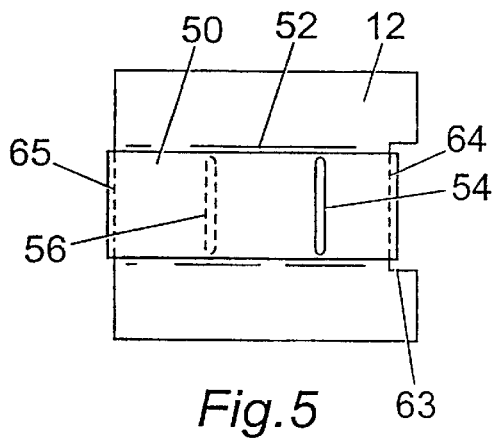
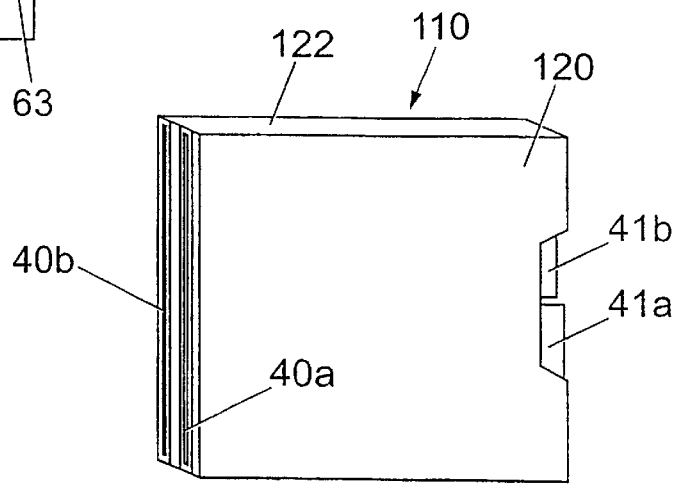

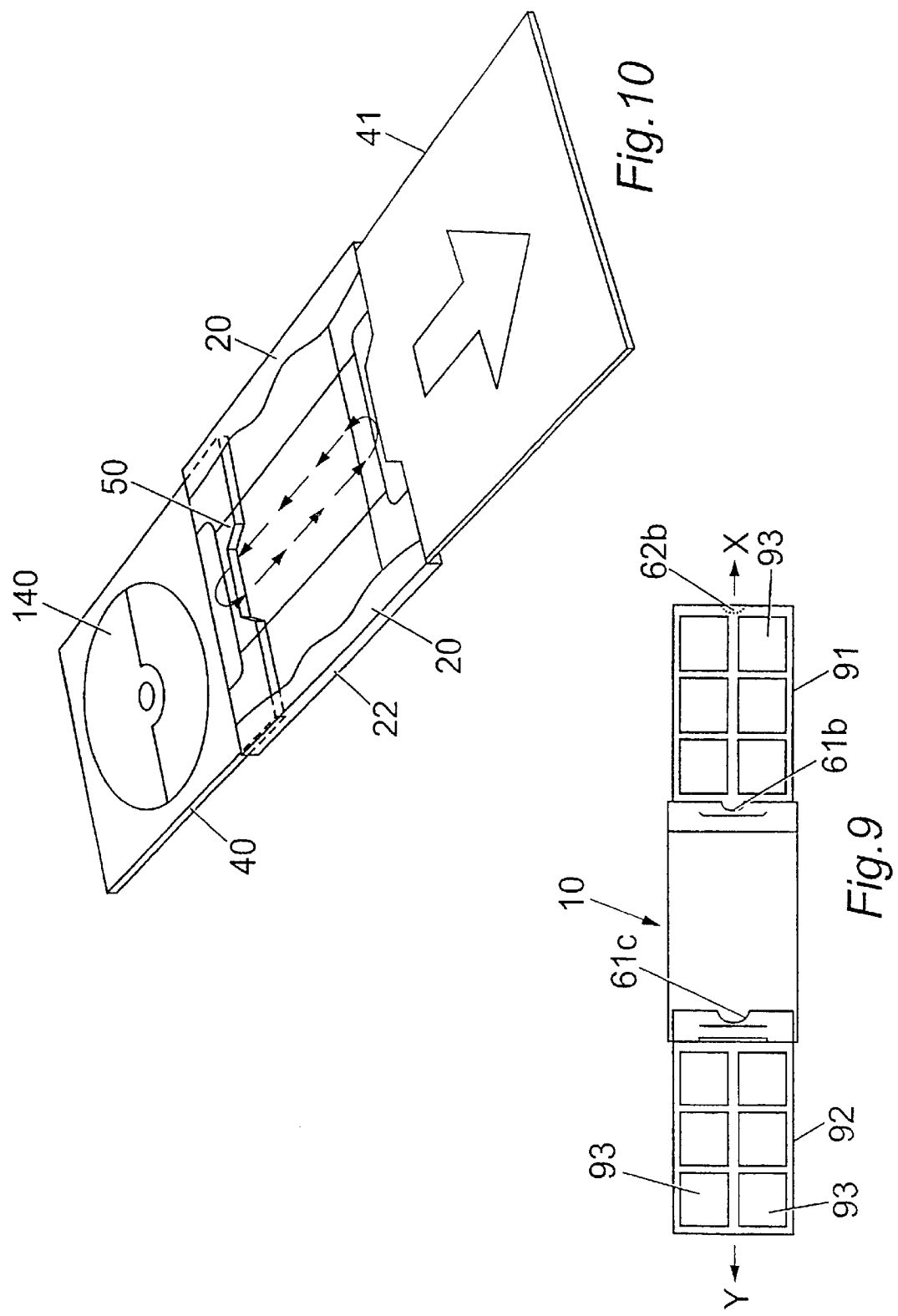

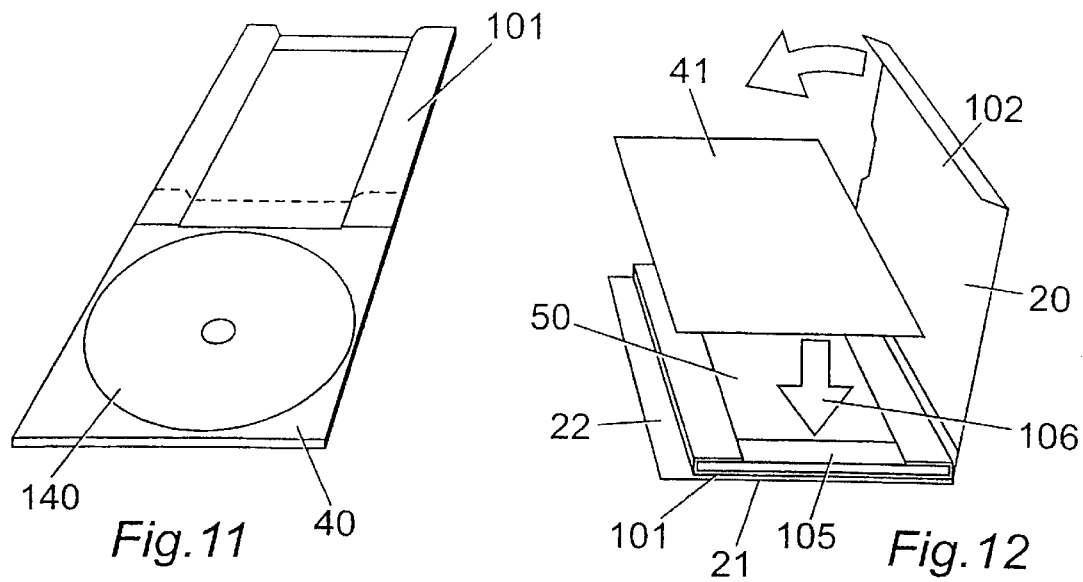
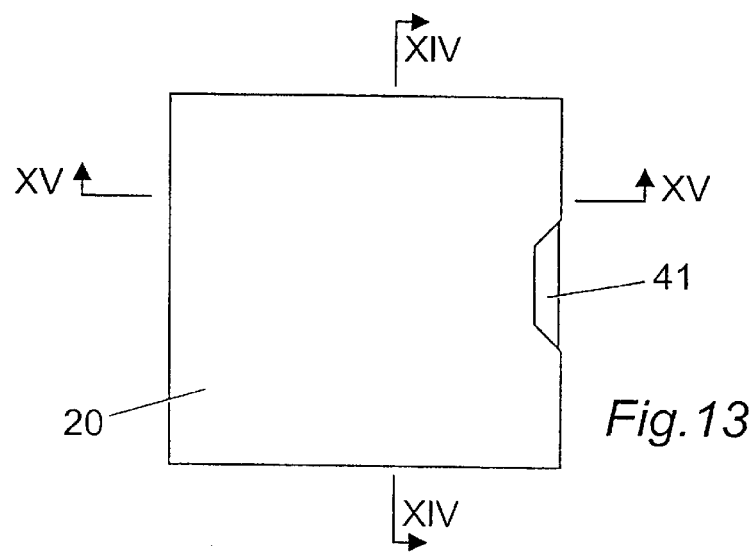
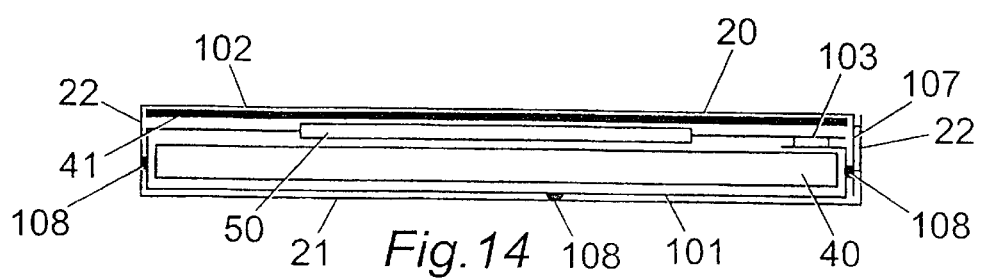

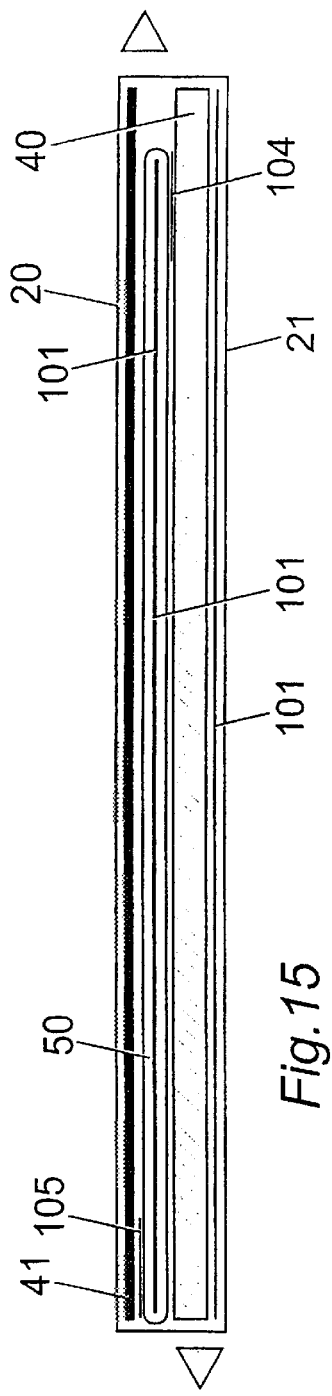
Fig.15
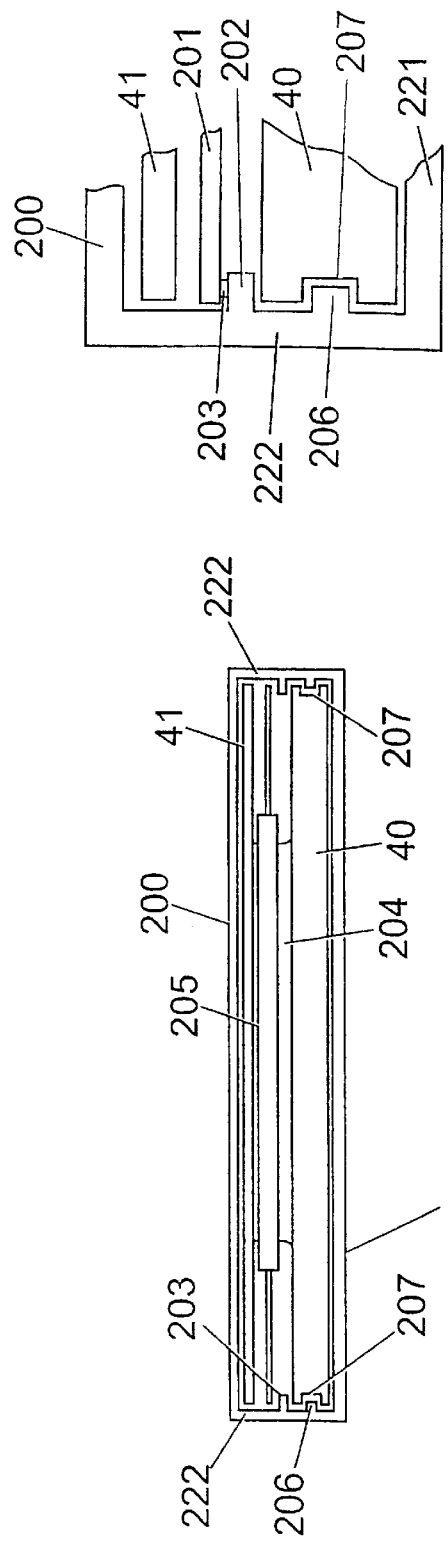
Fig.16
Fig.17

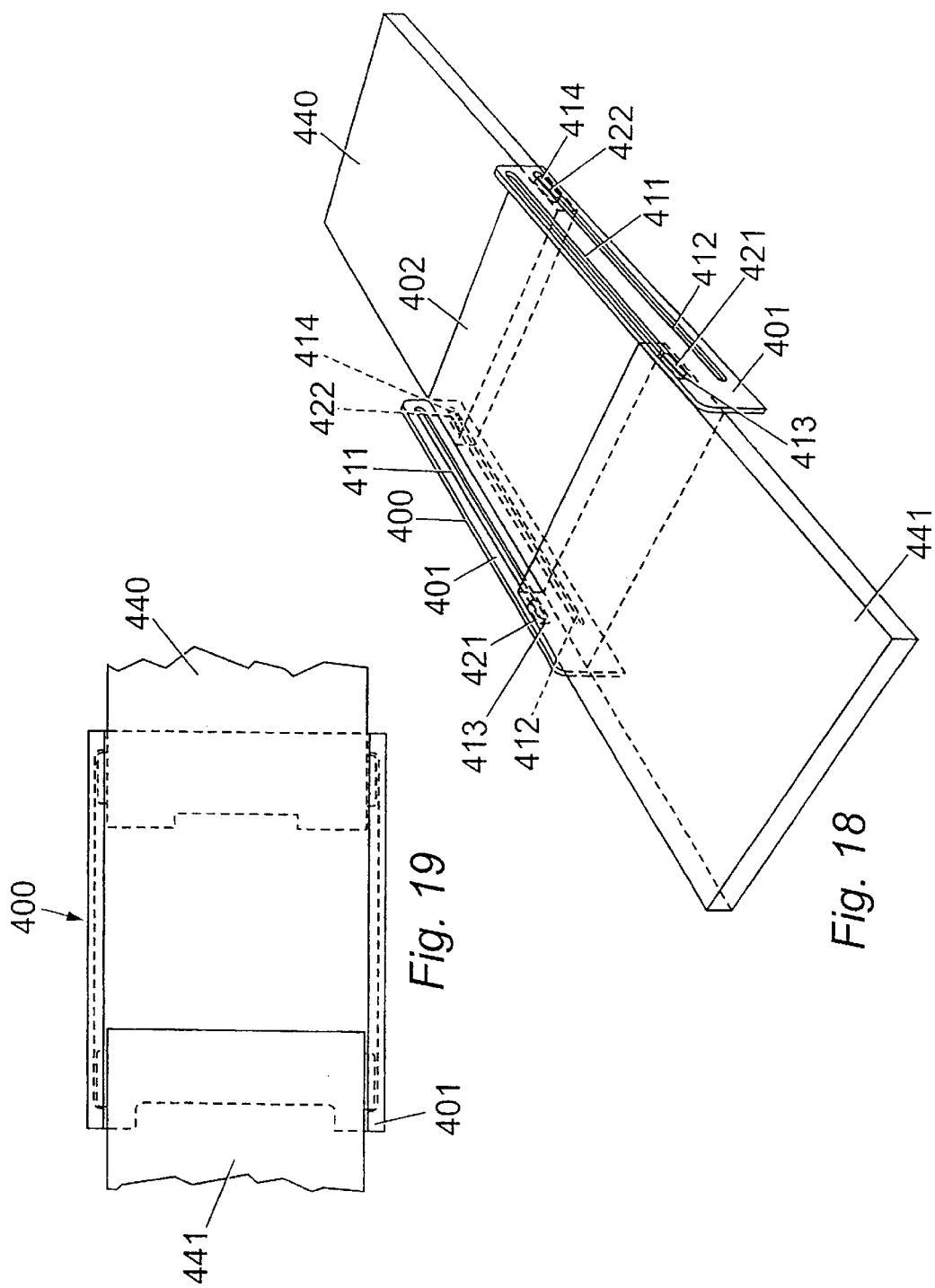

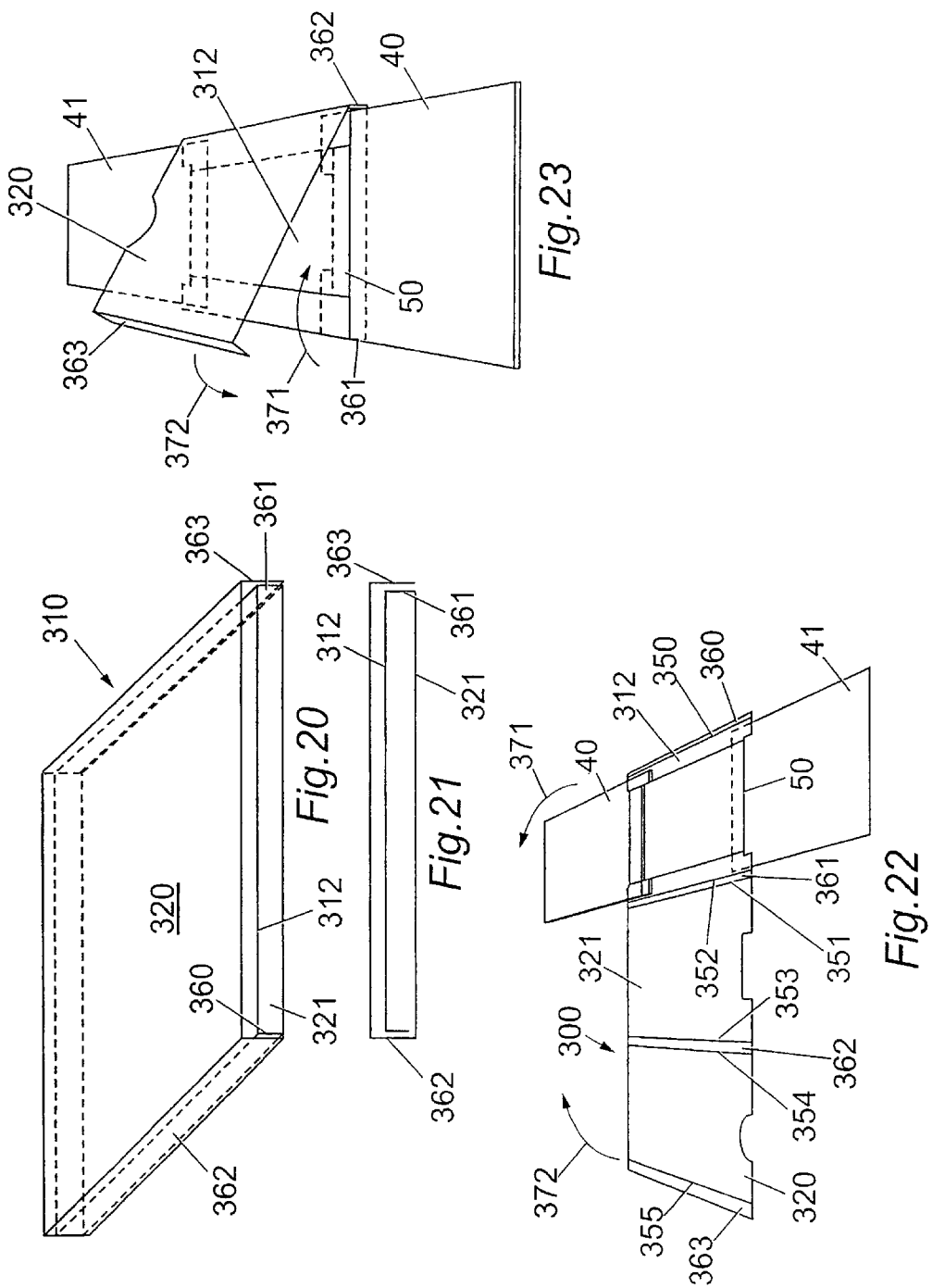

SLIDING TRAY PACKAGING

The present invention relates to a box which may be used in the packaging of any item which has a flat structure or which may be placed in a flat tray, in particular the packaging of compact discs, mini-discs, chocolates, pharmaceutical products, digital video discs, cigarettes, swatch samples, information cards and electronic components and similar products.

Compact discs are generally packaged in plastic jewel cases, in which a hinged lid must be lifted to gain access to a tray in which the compact disc lies. The case must be grasped in the correct fashion to enable the lid to be opened. People with small hands or limited use of their hands can have great difficulty in opening a standard jewel case. Information concerning the data or recording on the compact disc is usually provided on an insert or booklet attached to the underside of the hinged lid. It can be awkward to remove or replace this booklet, which must be passed under a series of projections on the side walls of the lid in order to retain it in place when the lid is closed.

Other methods of packaging compact discs and the like include simple cardboard sleeves or flexible plastic wallets. However such sleeves and wallets are not particularly rigid or robust and do not hold the packaged item securely.

It is an object of the invention to provide a packaging box which overcomes one or more of the above disadvantages, which is easy to open and which provides an opportunity to display information about the contents of the box.

According to a first aspect of the present invention there is provided a box comprising a generally tubular sleeve defining a through passage, a planar divider extending across said passage, a belt member extending around said divider, a tray member and a tab member each extending into said passage and attached to said belt member, such that when said tab member is moved out of said passage in a first direction said tray member moves out of said passage in a second direction opposite to said first direction.

Preferably the tubular sleeve is rectangular in section and comprises an upper panel, a lower panel and two side walls each connecting the upper and lower panels. Preferably the divider comprises an intermediate panel extending between the side walls. Preferably the intermediate panel is parallel to and spaced apart from the upper and lower panels.

In a first preferred embodiment the tubular sleeve and divider are formed from a single sheet of material, preferably card or plastic, which is folded and glued.

In a second preferred embodiment the tubular sleeve and divider are each formed from separate sheets of material, preferably card or plastic, which are folded and glued. The divider may comprise an inner tubular sleeve. The lower panel of the inner tubular sleeve may be bonded to the lower panel of the outer tubular sleeve.

In a third preferred embodiment the tubular sleeve is formed of moulded or extruded plastic. The side walls of the tubular sleeve may each be provided with a rail member adapted to engage with the tray member. The tray member may be provided with a corresponding slot at each side adapted to engage with the rail member. The rail member or slot may be provided with a stop member adapted to prevent the tray extending beyond a predetermined point. The side walls of the tubular sleeve may each be provided with a projecting flange member to which is attached the planar divider.

Preferably the tray member is adapted to be free to slide between a closed position, in which the tray member is completely enclosed by the tubular sleeve, and an open position in which the tray member protrudes from the tubular sleeve allowing access to the tray member.

Preferably the belt member comprises a strip of sheet material joined to form a continuous loop. Preferably said sheet material is a low-friction material selected so that the belt member slides easily about the divider. Preferably the sheet material is plastic such as Cellophane (TM) or PTFE. Preferably the belt member is narrower than the divider, and the divider is formed with a waisted or cut-out portion forming a belt path around which the belt member passes, so that the belt member is restrained against lateral movement with respect to the divider and stays on the belt path.

Preferably the upper and lower panels of the tubular sleeve are provided with cut-out portions or recesses on a first side thereof to permit access to the upper and lower surfaces of a portion of the tab member. Preferably the tab member and the upper and lower panels of the tubular sleeve project beyond the tray member at the first side when the tray member is in the closed position. The tray member may be narrower than the tubular sleeve, or the tray member may be provided with a cut-out portion or recess on its first side. This allows a user to grasp the portion of the tab member which is visible through the cut-outs in the sleeve, so that the user can pull the tab member in the first direction in order to open the tray member which slides out of the sleeve on the opposite side in the second direction.

Using the convention that the first edge of a component is that edge which is positioned towards the first direction and the second edge of a component is that edge which is positioned towards the second direction, then preferably the second edge of the tab member is attached to the belt member at a first location on the belt and the first edge of the tray member is attached to the belt member at a second location on the belt, whereby the first and second locations are diametrically opposed. Preferably, when the tray is in the closed position, the first location on the belt is at the second edge of the belt path and the second location on the belt is at the first edge of the belt path. Preferably, when the tray is in a fully open position, the first location on the belt is at the first edge of the belt path and the second location on the belt is at the second edge of the belt path.

According to a second aspect of the invention there is provided a box according to the first aspect of the invention, in which the tray member is replaced by a second tab member. Preferably one or both tab members are embossed or printed.

According to a third aspect of the invention there is provided a box according to the first aspect of the invention, in which the tab member is replaced by a second tray member.

According to a fourth aspect of the invention there is provided a box which comprises two or more boxes according to any of the first, second or third aspects of the invention connected on top of each other. Preferably the lower panel of an upper box forms the upper panel of a lower box.

According to a fifth aspect of the invention there is provided a blank which upon folding and gluing forms the tubular member and divider or dividers of a box according to any of the first, second, third or fourth aspects of the invention.

Preferably the blank comprises a substantially rectangular sheet of foldable sheet material having six transverse fold lines extending across the sheet, the fold lines separating the sheet into seven substantially rectangular areas, the second area forming in use the upper panel, the fourth area forming in use the lower panel, the sixth area forming in use the divider, the first and fifth areas being adapted to be bonded to each other to form in use the first side wall, and the third and seventh areas being adapted to be bonded to each other to form in use the second side wall. Preferably the second and fourth areas are each provided with a cut-out portion at one longitudinal edge. Preferably the sixth area is provided with a cut-out portion at each longitudinal edge, adapted to form a belt path around which in use the belt member passes.

Embodiments of the invention will now be described by way of example only with reference to the accompanying drawings in which:

FIG. 3 is a plan view on the box of FIG. 1 when the tray is in a half open position;

FIG. 4 is a section on line A—A of the box of FIG. 3;

FIG. 5 is a plan view on the divider of the box of FIG. 3 when the tray is in a half open position;

FIG. 6 is a perspective view of a box according to a second embodiment of the invention, with two tab members and two tray members;

FIG. 9 is a plan view of a box according to a fourth embodiment of the invention, for holding chocolates, where a tab member is replaced by a second tray member;

FIG. 10 is a perspective view of the box of FIG. 1 in the fully open position, with the upper part of the sleeve cut away to show the interior of the box;

FIG. 11 is a perspective view of the tray and carrier of a box according to a fifth aspect of the invention in which the carrier and outer case are separate;

FIG. 12 is a view of the box of FIG. 11 during assembly, showing the placement of the tab member or pull and the outer case around the carrier and tray;

FIG. 13 is a plan view on the assembled box of FIG. 12;

FIGS. 14 and 15 are sections on lines XIV—XIV and XV—XV respectively through the box of FIG. 13;

FIG. 16 is a section through a box according to a sixth embodiment of the invention;

FIG. 17 is an enlarged view of part of FIG. 16;

FIG. 18 is a perspective view on a box according to a seventh embodiment of the invention;

FIG. 19 is a partial plan view on the box of FIG. 18;

FIG. 20 is a perspective view of a box according to an eighth embodiment of the invention, with the tab and tray members omitted for clarity;

FIG. 21 is a transverse section through the box of FIG. 20;

FIG. 22 is a perspective view of the box of FIG. 20 during a first stage of assembly, showing the tab and tray members;

FIG. 23 is a perspective view of the box of FIG. 20 during a second stage of assembly, showing the tab and tray members.

Figure 1:
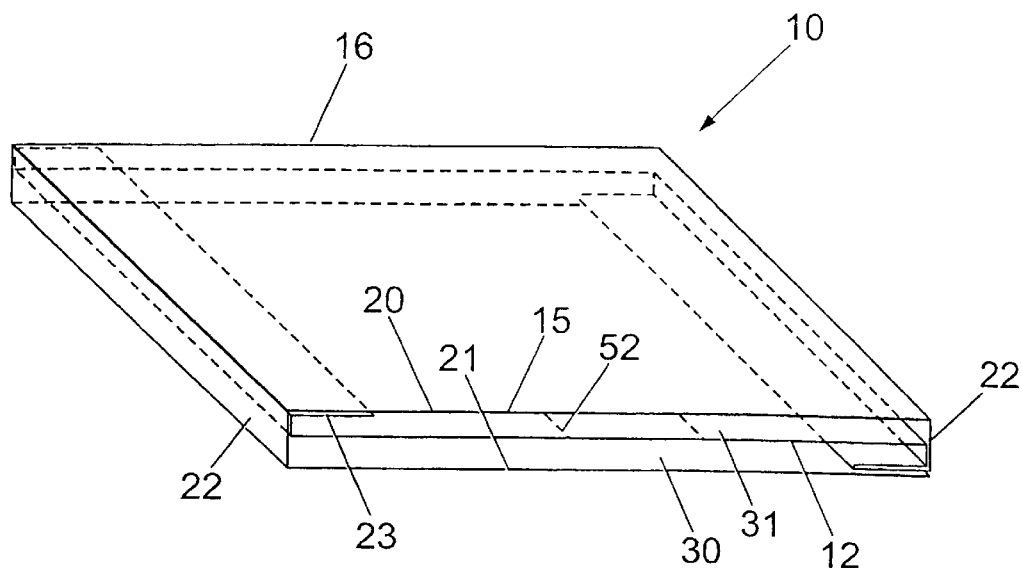
FIG. 1 is a perspective view of a box according to a first embodiment of the invention, with the tab and tray members omitted for clarity.
Figure 2:
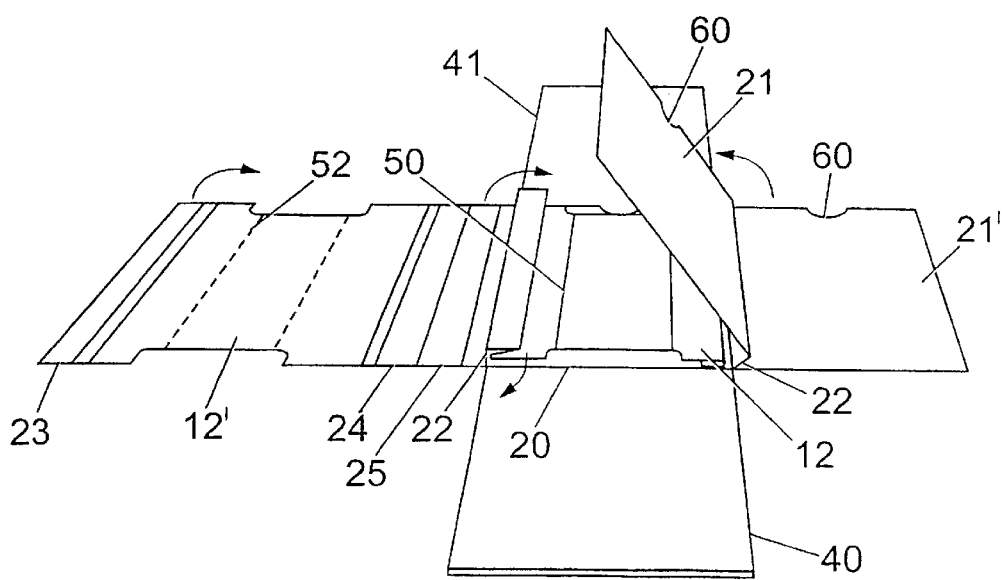
FIG. 2 is a perspective view of the box of FIG. 1 during assembly, showing the tab and tray members.

With reference to FIGS. 1 to 5 and 10, there is shown a box suitable for packaging a CD or other data disc. The box consists of a hollow rectangular tubular sleeve 10 or body with a divider 12 or chassis extending across the tube at an intermediate level. The sleeve 10 comprises an upper panel 20, a lower panel 21 and side walls 22. The sleeve and divider can be made by folding and gluing a single flat blank manufactured by cutting and creasing from a sheet material such as plastic, cardboard or folding box board, as can be seen in FIG. 2, which shows the positions 21', 12' of the lower panel 21 and divider 12 respectively before folding. FIG. 2 is a view from underneath the box.

Panel 23 is bonded to the underside of the upper panel 20, while panels 24, 25 are bonded to the upper side of lower panel 21.

The divider 12 divides the tubular passage formed by the sleeve into two smaller tubular passages, an upper passage 31 which contains a tab member 41 and a lower passage 30 which contains a tray member 40. The divider 12 has a belt 50 which passes around a belt path 52 defined on the divider. The belt is typically a strip of plastic film such as Cellophane (TM) or PTFE, whose ends are fastened to each other to form a continuous loop. Bonded to the belt 50 along a first line 54 is the tab member 41, while the tray member 40 is bonded to the belt 50 along a second line 56.

The upper and lower panels have a cut-out portion on the left hand side. In FIG. 2 the cut-out portion is shown as a semi-circular cut-out 60, while in FIG. 3 it is a trapezoidal cut-out 61, although other shapes are possible. The cut-out enables the user of the box to hold a portion 62 of the tab member 41 by grasping it on both sides and pulling the tab member in the direction of arrow X.

When the user pulls the tab member 41 in the direction of arrow X, the tab member 41 causes the belt 50 to turn about the divider 12 in the direction of arrow Z, since the tab member 41 is secured to the belt 50 by bond 54. The passage of the belt 50 causes the tray member 40 to move in the direction of arrow Y, since the tray member is attached to the belt 50 by bond 46. When the bonds 54, 56 reach the ends of the divider 12, the tab member 41 can be pulled no further in the direction of arrow X, and the tray member 40 is then in the fully open position.

When the user pushes the tab member 41 in the direction of arrow Y, the tab member 41 causes the belt 50 to turn about the divider 12 in a direction opposite to arrow Z, so that the tray member 40 moves in the direction of arrow X. When the bonds 54, 56 reach the opposite ends of the divider 12, the tab member 41 can be pushed no further in the direction of arrow Y, and the tray member 40 is then in the fully closed position. If required the user can push the tray portion 40 in the direction of arrow X to close the tray. The effect is the same, in that both the tray portion 40 and the tab portion 41 will return to the fully closed position.

The belt 50 is restrained on its belt path 52 on the divider by a waist portion 63, formed as a cut-out in the side of the divider 12, the cut-out being slightly wider than the belt 50. If required a cut-out 63 can be formed on each side of the divider, so that the belt 50 is set back from the edges 15, 16 of the sleeve 10 and cannot be seen in normal use of the box. The distance between the opposite ends 64, 65 of the belt path 52 defines the maximum total movement of both the tab and the tray. The length of the belt path 52 must therefore be chosen such that the travel of the tray member 40 is sufficient to give access to the contents of the tray when the tray member 40 is in the fully open position.

The tab member may be printed with information, such as information about the tracks or data on the CD, which is accessible when the tray and tab member are in the fully open position.

It should be noted that generally the sleeve will be wider between open sides 15, 16 than the tray member 40, so that when the tray member is in the closed position, a portion of the sleeve indicated by 17 in FIG. 3 overhangs the tray member 40, so that the tray member 40 does not interfere with the operation of the tab member 41 by grasping area 62. The edge 42 of the tray member 40 is generally flush with the edge 16 of the sleeve 10 when the tray member is in the closed position.

Figure 7:
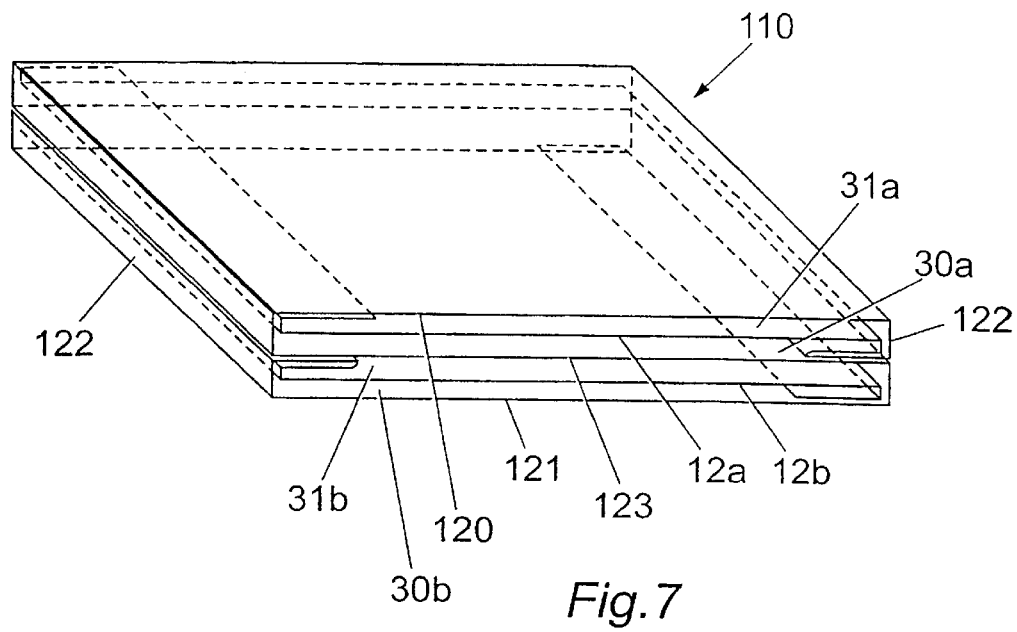
FIG. 7 is a perspective view of the box of FIG. 6, with the tab and tray members omitted for clarity, showing how the housing is formed by folding and gluing a single blank.

FIG. 6 shows an embodiment of the invention in which there are two tab members 41a, 41b and two tray members 40a, 40b. The sleeve 110 is illustrated in FIG. 7, and like the sleeve of FIG. 1 can be formed by folding and gluing a single blank sheet. The sleeve 110 is a hollow rectangular tubular sleeve with two dividers 12a, 12b extending across the tube at an intermediate level. The sleeve 10 comprises an upper panel 120, an intermediate panel 123 and a lower panel 21, joined by side walls 122.

The box functions as two separate boxes of the sort shown in FIG. 1, effectively stacked one on another, and divided by the intermediate panel 123, which serves as the lower panel for the upper box which defines an upper passage 31a which contains a tab member 41a and a lower passage 30a which contains a tray member 40a, and as an upper panel for the lower box which defines an upper passage 31b which contains a tab member 41b and a lower passage 30b which contains a tray member 40b. The tray members and tab members function exactly as those described with reference to FIG. 1. The tab members 41a and 41b are both provided with cut-outs at the side to permit grasping of a portion of the other tab member 41b and 41a respectively.

As an alternative arrangement to that shown in FIG. 6, the upper tray 40a could be replaced by a tab member, and the lower tab member 41b could be replaced by a tray member, so that both members 40a and 41a are transparent or semi-transparent overlays which may be pulled out over the tray members 40b and 41b. The overlays could be printed with information relating to the items found in the trays directly beneath the overlays when both trays and overlays are in the fully open position.

Figure 8:
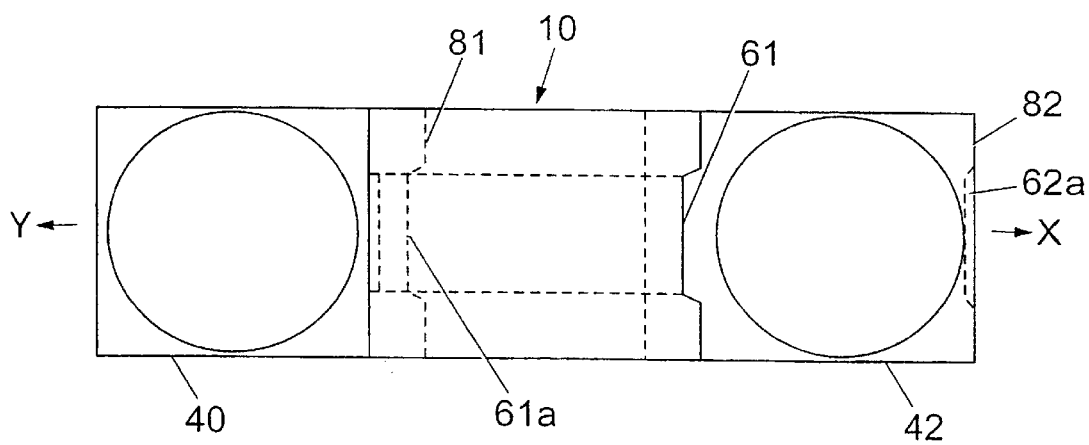
FIG. 8 is a plan view of a box according to a third embodiment of the invention, for holding two CDs, where a tab member is replaced by a second tray member.
Figure 24:
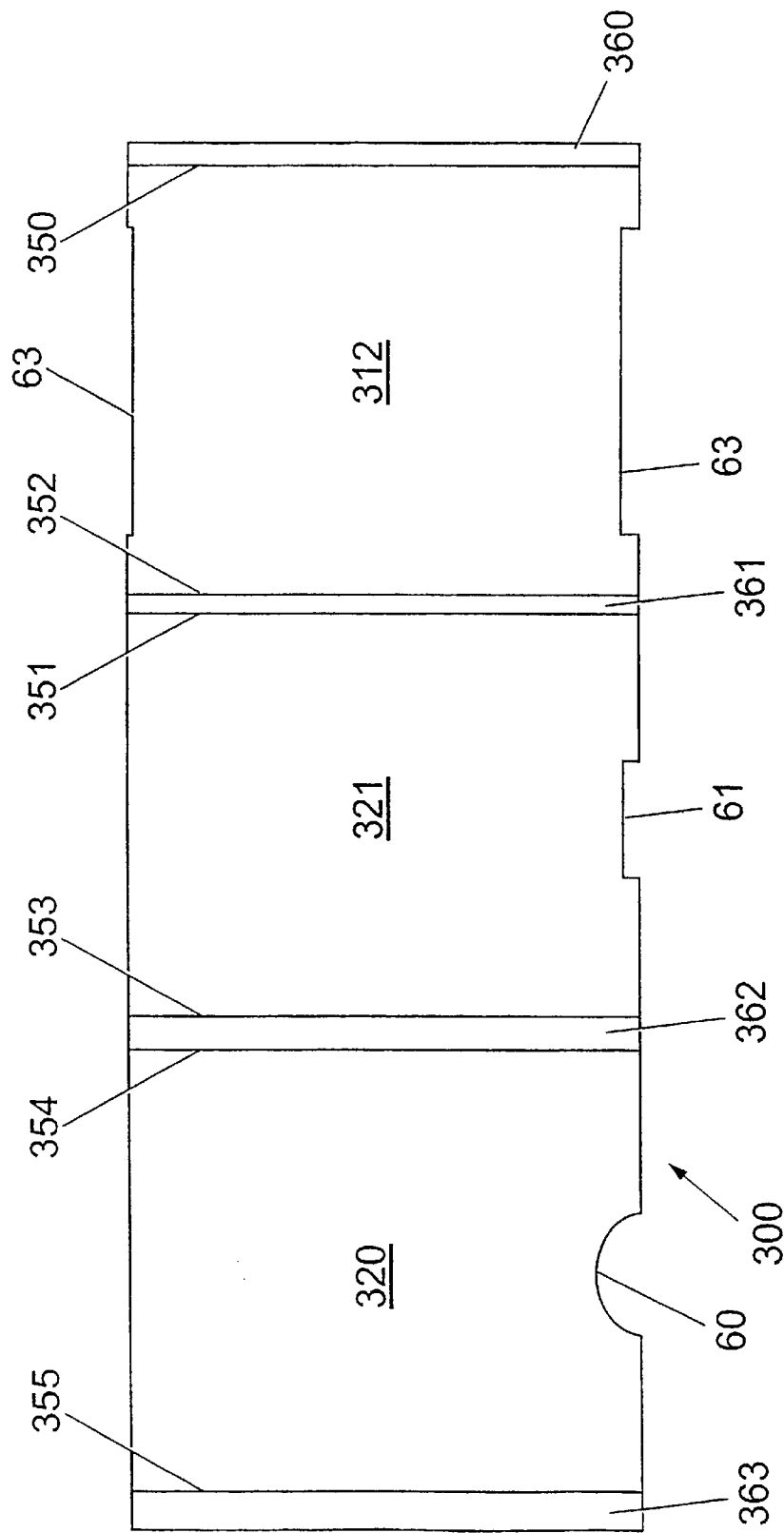
FIG. 24 is a plan on the blank used in the manufacture of the box of FIG. 20.

FIG. 8 shows an embodiment of the invention similar to that shown in FIG. 1, but in which the tab member 41 is replaced by a second tray member 42. This embodiment is suitable for using as a "double CD" box for holding two CDs. The box is opened by holding the area 62a of the second tray member 42 and pulling in the direction of arrow X. This causes the first tray member 40 to move in the direction of arrow Y. In this embodiment the first tray 40 has a cut-out portion 61a corresponding to the cut-out 61 in the sleeve 10, so that when the first tray 40 is in the fully closed position, such that edge 81 of the first tray 40 is aligned with edge 82 of the second tray 42, the area 62a of the second tray 42 is still accessible.

FIG. 9 shows an embodiment of the invention similar to that illustrated in FIG. 8, in which there are two tray members 91, 92. However in this embodiment the tray members are adapted to hold chocolates. The tray members may be formed of folded card and may have injection moulded liners formed to hold the chocolates 93. The box is opened by holding the area 62b of the second tray member 91 and pulling in the direction of arrow X. This causes the first tray member 92 to move in the direction of arrow Y. In this embodiment the first tray 92 has a semi-circular cut-out portion 61c corresponding to the cut-out 61b in the sleeve 10, serving the same purpose as the cut-out 61a in FIG. 9.

The sleeve may be decorated by printing, made easier by the fact that all the surfaces which show on the outside of the packaging are on the same side of the blank.

As the sleeve is manufactured from rigid cardboard or foldable plastic, it is lightweight, durable and provides good shock resistance. The blank for the sleeve is cut in one piece and may be assembled by machine folding and gluing. Furthermore, if the tray and tab members are also manufactured from card, it may contain a high percentage of recycled material, and the pack itself may be recycled.

Alternatively the tray members may be made of plastic, and may contain a standard retaining clip for retaining a CD through the central aperture in the CD. The tab member may be card or plastic, for example polystyrene or polycarbonate, or other material which is suitably rigid. The body sleeve could be made by other methods, such as moulding or extrusion and can be made from plastic materials such as polystyrene or polycarbonate.

FIGS. 11 to 15 show another embodiment of the invention in which the sleeve is not made from one member. In this embodiment the box consists of a separate carrier 101 equivalent to the chassis 12 of FIG. 1 and a separate outer case 102 which forms the upper panel 20, lower panel 21 and side walls 22. The outer case 101 wraps around the carrier 101, which contains the tray member 40 and CD 140 or other product, and the pull or tab member 41. The carrier can be blank card or plastic, and does not need to be printed. This particular form of box construction is suited to automated manufacturing processes, since the folding sequence required to construct the box is greatly simplified. As can be seen from FIG. 14, the carrier 101 has a belt 50 folded and glued around it, preferably while the carrier is still in a flat, unfolded state. Adhesive 104 is applied to either the tray 40 or the belt 50 and the carrier 101 is then wrapped around the tray 40 and the ends of the carrier are glued 103 so that the carrier forms a rigid rectangular tube, with a strip of adhesive 104 securing the belt 50 to the tray 40, as seen in FIG. 15.

A further strip of adhesive 105 is then applied to the belt and the pull 41, which may be provided with printed information, is placed in the direction of arrow 106 onto the carrier 101 so that the strip of adhesive 105 secures the belt 50 to the pull 41. The outer case 102 is then folded around both the carrier 101 and pull 41, in the direction of arrow 107, and glue 107 is applied to the flaps 108 forming the side wall 22, so that the outer case 102 is a rigid rectangular tube. Adhesive 108 is also applied between the outer case 102 and the carrier 101 where they are in contact. Only the pull member 40 and the outer case 102 need be printed, making printing costs lower. Printing is required on one side of the outer case 102 only. The pull 41 may comprise a double layer of folded card to make it more rigid and able to withstand pushing and pulling by the user of the box, and to provide printed matter on both sides of the pull 41 while printing on only one side of the blank.

FIGS. 16 and 17 show another embodiment of the invention in which the sleeve 200 of the box is made from plastic, and may be formed by any suitable method, such as extrusion, vacuum moulding or injection moulding. The box contains a pull member 41, a chassis member 201 with a belt 50, and a tray 40, and functions in the same way as the box described above with reference to FIG. 1. The sleeve 200 is a rigid rectangular sleeve, and the side inner surfaces of the sleeve are each provided with a shelf member 202, to which is fastened the chassis member 201 by any suitable means, such as adhesive 203. Two rail members 206 cooperate with two channels 207 formed in opposite sides of the tray 40, which is preferably also of plastic. As the tray is pulled out of the sleeve 200 by action of the belt 50 mounted on the chassis 201 and fastened by adhesive 204, 205 to the tray 40 and pull member 41, in the manner described above with reference to FIG. 1, the rails 206 and channels 207 serve to guide the tray so that it moves smoothly and so that rocking motion is prevented. The tray 50 is held stably even when cantilevered out from the sleeve 200 so that only a small proportion of the tray 40 is still within the sleeve 200. Stop members (not shown) may be provided on the rails 206 or in the channels 207 to stop the tray 40 from being pulled out too far. The rails 206 and channels 207 may be omitted, so that the shelf member 203 serves as a guide rail itself, holding the edge of the tray 40 within the channel formed by the shelf member 203, the side wall 222 and the bottom 221 of the sleeve.

FIGS. 18 and 19 show a further embodiment of the invention in which the sleeve of the box has a frame 400 made from plastic, which may be formed by any suitable method, such as extrusion, vacuum moulding or injection moulding. In FIGS. 18 and 19 the top and bottom panels are omitted for clarity, but it is to be understood that these may be of plastic, and may be formed with the frame, or they may be of another material such as card which is wrapped around the frame after manufacture of the frame and assembly of the tray and pull member.

The frame comprises two side members 401 and a divider or chassis member 402 which spans between the side members. A belt (not shown) is looped around the divider, as in the other embodiments, and need not be described here further. The box contains a pull member 441 and a tray 440, and functions in the same way as the box described above with reference to FIG. 1. The side inner surfaces of the side members 401 are each provided with two longitudinally extending grooves 411, 412, which may extend part of the way into the side walls (as illustrated in FIG. 19), or may be in the form of through slots (as illustrated in FIG. 18). Both the pull member 441 and the tray member 440 are provided with projecting tongue portions 421, 422 adapted to engage with the grooves or slots 411, 412. Preferably the pull member 441 and tray 440 are both of plastic. As the tray 440 is pulled away from the frame 400 by action of the belt 50 mounted on the chassis 402, in the manner described above with reference to FIG. 1, the grooves 411, 412 and tongues 421, 422 serve to guide the tray and pull portion so that they move smoothly and so that rocking motion is prevented. The ends 413, 414 of the grooves 411, 412 limit the motion of the tongues 421, 422, to stop the tray 440 from being pulled out too far.

FIGS. 20 to 24 show a box similar to that described with reference to FIGS. 1 to 5, which differs only in the way that the blank 300 is assembled to form the hollow rectangular tubular sleeve 310 and divider 312. The sleeve 310 comprises an upper panel 320, a lower panel 321 and side walls 362, 363. The sleeve and divider can be made by folding and gluing a single flat blank manufactured by cutting and creasing from a sheet material such as plastic, cardboard or folding box board, provided with a series of transverse fold lines 350–355 which divide the blank into seven panels. The blank is laid flat, as shown in FIG. 22, the belt 50 is secured around the divider 312, and then the tray 40 and tab member 41 are secured to the belt 50 by any suitable adhesive means. The panel 360 is folded up by 90 degrees about fold line 350. The divider 312, together with the tray 40 and tab member 41, is then folded onto the lower panel 321 in the direction of arrow 371, by forming two 90 degree folds on fold lines 351, 352. The panel 361 between fold lines 351, 352 forms the inner part of the first side wall. The panel 360 forms the inner part of the second side wall.

The upper panel 320 is then folded onto the lower panel 321 and divider 312 in the direction of arrow 372, by forming two 90 degree folds on fold lines 353, 354. The panel 362 between fold lines 353, 354 forms the outer part of the second side wall.

Finally the panel 363 is folded down by 90 degrees about fold line 355 to form the outer part of the first side wall.

The box functions in the same way as the embodiments described above, and is not described further here. The method of manufacture described with reference to FIGS. 20 to 24 provides a particularly efficient method for mass production using one-piece blanks, with a minimum number of folds.

The invention encompasses boxes which do not contain removable products but are used to display products or information. The tray may be replaced by a second tab member, so that pulling on a tab member on one side of the sleeve causes the other member to be drawn out on the other side of the sleeve. The tab members could contain printed information or fabric swatch samples, so that the box can be used as a promotional tool. The mechanism of the box remains unchanged.

The box can be used for compact discs, mini-discs, digital video discs, confectionery, chocolates, pharmaceutical products, jewellery, cigarettes, swatch samples, information cards and electronic components and any other products which can be packaged in trays.

The sleeve can have a finishes applied by foil blocking and embossing. The packaging could be provided with a wipe-clean finish by printing a varnish onto the print surface or by film laminating.

There is no forcible locking device on the packaging, so that the product can be loaded or unloaded easily, making the package suitable for the elderly and infirm.

The packaging can be made in many shapes and sizes and of various different materials, and is not limited to the shapes shown in the Figures.

Improvements and modifications may be incorporated without departing from the scope of the invention.

What is claimed is:

1. A box comprising a generally tubular sleeve defining a through passage, a planar divider extending across said passage, a belt member extending around said divider, a tray member and a tab member each extending into said passage and attached to said belt member, such that when said tab member is moved out of said passage in a first direction said tray member moves out of said passage in a second direction opposite to said first direction, wherein said belt member is in the form of a continuous loop such that when said tab member is moved into said passage in said second direction said tray member moves into said passage in said first direction.

2. A box according to claim 1, wherein the tubular sleeve comprises an upper panel, a lower panel and two side walls each connecting the upper and lower panels, and wherein the divider comprises an intermediate panel extending between the side walls parallel to and spaced apart from the upper and lower panels.

3. A box according to claim 1, wherein the tubular sleeve and divider are formed from a single sheet of material, which is folded and glued.

4. A box according to claim 1, wherein the tubular sleeve is formed of moulded or extruded plastic.

5. A box according to claim 4, wherein the side walls of the tubular sleeve are each provided with a rail member adapted to engage with a corresponding slot provided at each side of the tray member.

6. A box according to claim 4, wherein the side walls of the tubular sleeve are each provided with a slot adapted to engage with a corresponding projecting portion provided at each side of the tray member.

7. A box according to claim 6, wherein the slots are provided with stop ends adapted to abut against the projecting portion when the tray is in a fully extended position in said second direction to prevent the tray extending beyond a predetermined point.

8. A box according to claim 1, wherein the belt member comprises a strip of sheet material joined to form said continuous loop, said sheet material being a low-friction material selected so that the belt member slides easily about the divider.

9. A box according to claim 8, wherein the belt member is narrower than the divider, and the divider is formed with a waisted or cut-out portion forming a belt path around which the belt member passes, so that the belt member is restrained against lateral movement with respect to the divider and stays on the belt path.

10. A box according to claim 1, wherein the upper and lower panels of the tubular sleeve are provided with cut-out portions or recesses on a first side thereof to permit access to the upper and lower surfaces of a portion of the tab member.

11. A box according to claim 1, wherein:

the first and second edges of the tab member, tray member, divider and sleeve are the edges positioned towards the first and second directions respectively, the second edge of the tab member is attached to the belt member at a first location on the belt and the first edge of the tray member is attached to the belt member at a second location on the belt, whereby the first and second locations are diametrically opposed on the belt.

12. A box according to claim 11, wherein:

when the tray is in the closed position, the first location on the belt is at the second edge of the belt path and the second location on the belt is at the first edge of the belt path; and when the tray is in a fully open position, the first location on the belt is at the first edge of the belt path and the second location on the belt is at the second edge of the belt path.

13. A composite box comprising two or more boxes according to claim 1 connected on top of each other, whereby the lower panel of an upper box is adjacent to or is common to the upper panel of a lower box.

14. A blank which upon folding and gluing forms the tubular member and divider of a box according to claim 1, comprising a substantially rectangular sheet of foldable sheet material having six transverse fold lines extending across the sheet, the fold lines separating the sheet into seven substantially rectangular areas, the second area forming in use the upper panel, the fourth area forming in use the lower panel, the sixth area forming in use the divider, the first and fifth areas being adapted to be bonded to each other to form in use the first side wall, and the third and seventh areas being adapted to be bonded to each other to form in use the second side wall.

15. A blank according to claim 14, wherein the second and fourth areas are each provided with a cut-out portion at one longitudinal edge.

16. A blank according to claim 14, wherein the sixth area is provided with a cut-out portion at each longitudinal edge, adapted to form a belt path around which in use the belt member passes.

17. A box comprising a generally tubular sleeve defining a through passage, a planar divider extending across said passage, a belt member extending around said divider, a first tab member and a second tab member each extending into said passage and attached to said belt member, such that when said first tab member is moved out of said passage in a first direction said second tab member moves out of said passage in a second direction opposite to said first direction, wherein said belt member is in the form of a continuous loop such that when said first tab member is moved into said passage in said second direction said second tab member moves into said passage in said first direction.

18. A box comprising a generally tubular sleeve defining a through passage, a planar divider extending across said passage, a belt member extending around said divider, a first tray member and a second tray member each extending into said passage and attached to said belt member, such that when said first tray member is moved out of said passage in a first direction said second tray member moves out of said passage in a second direction opposite to said first direction, wherein said belt member is in the form of a continuous loop such that when said first tray member is moved into said passage in said second direction said second tray member moves into said passage in said first direction.

\* \* \* \* \*